March 15, 1966     J. L. TUCKER ET AL     3,240,658
FIBER REINFORCED PLASTIC MATERIAL AND METHOD OF PREPARING
Filed May 18, 1960     2 Sheets-Sheet 1
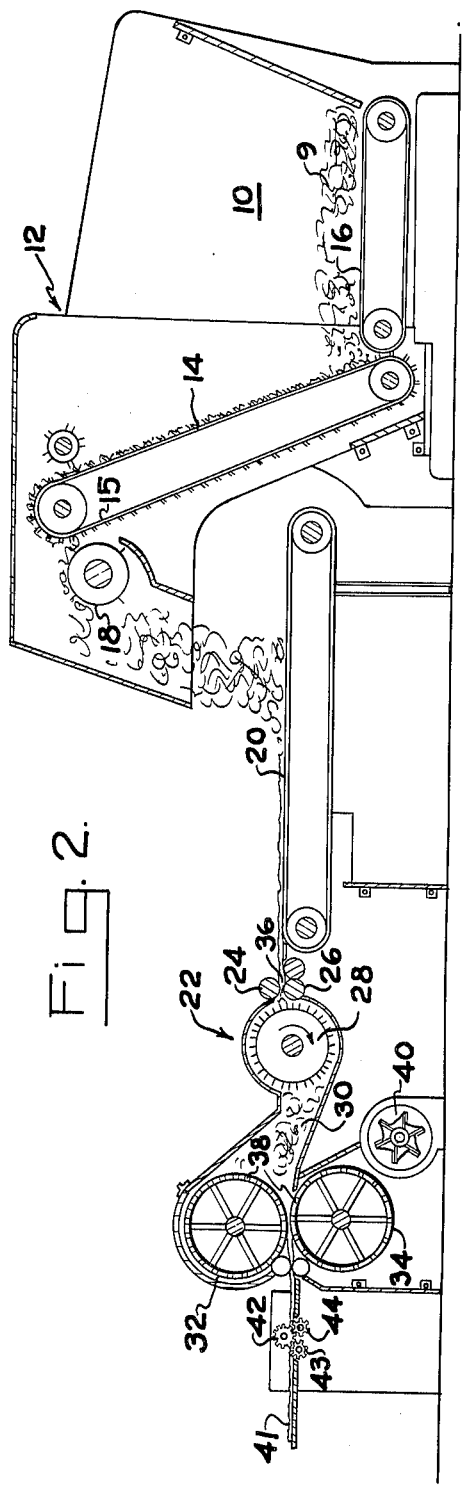
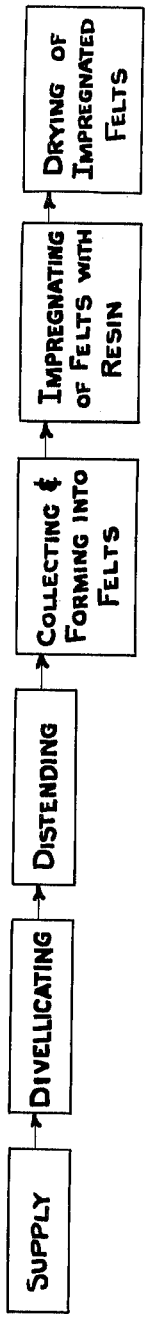
INVENTOR.
JESSE L. TUCKER
BY IRVIN BARNETT
ATTORNEY March 15, 1966   J. L. TUCKER ET AL   3,240,658
FIBER REINFORCED PLASTIC MATERIAL AND METHOD OF PREPARING
Filed May 18, 1960   2 Sheets-Sheet 2

INVENTOR.
JESSE L. TUCKER
BY IRVIN BARNETT
ATTORNEY

United States Patent Office 3,240,658
Patented Mar. 15, 1966

3,240,658
FIBER REINFORCED PLASTIC MATERIAL AND
METHOD OF PREPARING
Jesse L. Tucker, North Plainfield, and Irvin Barnett, Martinsville, N.J., assignors to Johns-Manville Corporation, New York, N.Y., a corporation of New York
Filed May 18, 1960, Ser. No. 29,858
15 Claims. (Cl. 161—170)

This invention relates to a fiber-reinforced plastic article, moldable material from which the plastic articles are made, processes for preparing such moldable materials and methods of forming the fiber-reinforced articles. More particularly the invention relates to a fiber-reinforced moldable article possessing unusually high heat and flame resistance. Most particularly it relates to asbestos-reinforced thermosetting resin articles possessing superior heat and flame resistant characteristics. Such articles find particular adaptation in high temperature insulation. The invention further relates to the production of plastic impregnated preform sheets having long storage or "shelf life," i.e., one which remains plastic and conformable in all dimensions for long periods of time after impregnation. The invention is especially concerned with the use of such insulating materials in the formation of rocket missiles wherein a homogeneous construction of the high temperature insulation is highly desirable. It is additionally desirable that the insulating material be capable of easy and quick shaping in the formation of the rockets long after it has been formed into a sheet material.

It is common practice to incorporate filler material of various types in molding compounds of thermosetting plastic resin in order to produce molding compounds which not only possess high mechanical strength, but also other good physical characteristics such as heat and flame resistance. Other desirable characteristics include extended shelf life with resulting good workability and flow characteristics. The term "flow" as employed here denotes the desired property of the resin and filler to migrate. In the past it has been recognized that such inorganic refractory materials as asbestos fibers, glass fibers, and mineral wool, and also certain synthetic fibers may be used to impart reinforcing characteristics to the resinous composition. The addition of these materials provides greater tensile, flexural and other strength characteristics to the molded article that could not be obtainedd by an unreinforced-plastic material.

Such molding compounds have found particular adaptation in "bag molding." In such an operation, the molding compound is placed in an unconfined mold, the mold placed within a flexible cover, and the compound caused to assume the configuration of the mold by means of a pressure differential. This "bag molding" operation has been used in many different applications. One particular use has been in the production of insulation for rockets and the like.

The molding composition used in rockets, and the like, in addition to ease of shaping should possess other significant characteristics. Certain parts of rockets are required to withstand very high temperatures. It is therefore highly desirable that a protective liner be incorporated in the rocket in such positions as the motor, nozzle, and nose cone mold to provide a thermal barrier wherein temperatures as high as 13,000° F. or higher are encountered. In such insulation, it has been found highly advantageous to provide such a thermal barrier which protects the surrounding surface by the process of ablation. Ablation as it is used in relation to thermal insulation, is the absorption of heat during the process of surface material removal by melting and vaporization. The absorption causes the protective surface to remain relatively cool. Certain synthetic plastics have been proven to possess excellent ablation characteristics because of the destruction of their chemical nature requiring an endothermic chemical reaction. Additionally, when it is desirable to have resistance to physical erosion or abrasion, reinforced plastic materials are used.

However, the molding materials chosen in the past have proven to be deficient in several respects. These materials consist generally of a non-woven felt pretreated with small amounts of binder to form a rigid oriented mat. These mats are processed in a normal manner which consists of either impregnating and/or pre-impregnating the felt with a particular resin material, completely drying the thus treated felt and partially curing the resin to guarantee some sort of shelf life. Normally several of these sheeets are laminated to provide the desired thickness of the final product. However, these materials have only exhibited a relatively short shelf life consisting of about 2 to a maximum of about 4 weeks. After this time, they are not sufficiently pliable to be formed into intricate shapes by hand. This is probably so because the resin has progressed to the finally cured stage, or, as termed in some resins, the "C-stage." At this point, the resin flow in the laminating or molding process is at a minimum and consequently inadequate for selective molding operations. This latter situation is due to the fact that the fibers are incapable of migrating because of the poor resin flow. Consequently, in order to provide a strong protective insulation, it has been necessary to cut shaped segments from the cured material and fit them in abutting relationship. It can be well appreciated that such an operation is not only tedious but time consuming. A reasonable estimate of the man hours required to "mock-up" or insert these pieces of the molding material in place in a single missile insulation is two-thousand. Moreover, these laminates have proven deficient when later exposed to the high temperature and heat conditions. As a result of this piece-meal mock-up, sharp lines develop between individual pieces which cannot adequately be molded. These are referred to as "channels." Also because of their laminated structure they tend to chip, "break off in chunks" or delaminate during the ablation process. This causes uneven removal and appreciably lessens the life of the insulating material.

Consequently, the missile manufacturers are desirous of obtaining insulating molding materials which possess (1) a relatively long shelf life, (2) plasticity which will allow hand formation into various intricate shapes after relatively long periods of storage, and which will also deter the formation of the channels between the individual pieces, (3) adhesion to the metal surface to be protected, (4) physical erosion and/or abrasion resistance, (5) resistance against extreme high temperatures and flames, and (6) good resin flow when finally molded or shaped.

Accordingly, it is the primary object of this invention to produce a fiber-reinforced resinous preform material having an extended shelf life and improved flow characteristics.

It is an additional object of this invention to produce a fibrous-reinforced resinous preform material which possesses excellent high heat resistance in addition to good mechanical strength.

Still another object of this invention is to provide a molding composition which has low mold shrinkage, increased plasticity, good flow properties, and which will provide articles having the properties mentioned in the foregoing objects.

It is a further object of this invention to provide a time, which time is commonly referred to as the "shelf life and because of such long shelf life continues to remain in a substantially plastic state capable of being hand shaped to conform to various configurations.

A still further object of this invention is to provide a fiber-reinforced preform material possessing excellent ablation properties for use as a thermal barrier in such applications as rocket missiles.

It is another object of this invention to produce a material described in the foregoing objects which is sufficiently pliable and plastic so that it can be formed to any desired shape without tedious cutting, forming and fittings.

It is another object of this invention to provide a process of forming the fiber-reinforced resinous preform material possessing all of the desired characteristics mentioned above.

Other objects and further scope of applicability of the present invention will become apparent from the detailed description given hereinafter. It should be understood, however, that the detailed description, while indicating preferred embodiments of the invention, is given by way of illustration, since various changes and modifications within the spirit and scope of this invention will become apparent to those skilled in the art.

In brief, these objects are accomplished according to the present invention by performing the following series of steps:

The mineral fiber chosen, such as asbestos fiber, is mechanically torn apart so that the agglomerates of fibers are openly distended. An air stream collects the distended fibers and carries them to a foraminous conveyor to form a felt of pre-determined dimensions and having a density preferably within the range of 25 to 50 pounds per cubic foot. This felt is then impregnated with a thermosetting resin such as a phenol formaldehyde condensation product preferably in an amount of about 15 to about 80 percent by weight of the final product. The resinous material is in a solution with a solvent carrier such as ethyl alcohol. The impregnated fiber felt is then heated to controlled temperature and/or pressure conditions to remove a portion of the solvent carrier. The heating additionally partially cures the thermal resin to what is commonly known as the "B-stage." This curing is controlled so as to provide a film on the exterior surface of the fiber and to entrap part of the liquid resin carrier. By so treating the felt, the resultant product remains pliable and flexible over an extended period of time, which time is commonly referred to as the "shelf life." The thus formed sheet material is later molded to conform to the particular configuration of the object to be insulated and is then subjected to elevated temperatures and other conditions sufficient to fuse the impregnated resin into a solid matrix by curing the resin into a thermal stage known as the "C-stage." While the invention has shown particular adaptation employing asbestos fibers as the reinforcement, other mineral or inorganic fibers and various synthetic fibers may be employed depending on the desired characteristics. Such fibers include glass fibers, and any high-temperature resistant synthetic filaments. Additionally, other material such as fillers, pigments, etc. up to 30 percent by weight of final product, may be incorporated in or on the fibrous mat. Particularly useful are opacifiers such as titanium compounds, tungsten wire, carbon powders and other well known materials which help to lessen the radiation losses.

In insulations where the product is to be subjected to erosive conditions, it is desirable to provide a product of maximum density. Hence, it is desirable to maintain the maximum fiber content, since fibers are denser than resins. However, in order to sufficiently impregnate the fiber network and yet sustain moldable characteristics for use in applications for which this invention is particularly adapted, the resin content should be within the range of 20-65 percent. As the resin content is increased above the indicated preferred upper limit the tendency for the fibers to "bleed" or flow out, with a concomitant loss in locking action, is increased. In other applications where the indicated characteristics are not necessary, the resin content may vary from the indicated percentages and extend to a range of 15-80 percent.

It is also preferred to maintain the percentage of entrapped solvent within the range of 6-12 percent. As the solvent content is increased above the indicated preferred limit, there is a tendency for the product to become too tacky to be workable, and to result in excessive flow and/or blistering when the product is finally cured. A deviation from the lower indicated preferred solvent content limit increases the tendency to produce incipient cracks and crazing in the final product and resultant premature destruction of the product.

The nature of the invention and further objects and advantages thereof will appear more fully from the following description particularly when taken in conjunction with the accompanying drawings, in which:

FIG. 1 is a schematic flow diagram of the primary steps of the present invention for the forming and succeeding treatment of a fibrous skeleton to produce a fiber-reinforced resinous sheet;

FIG. 2 is a schematic side elevational view of apparatus which may be employed to divellicate and distend the fibers of the instant invention;

An exemplary procedure for carrying out the process of the invention is shown in FIG. 1. In such a process, a supply of fibrous material such as chrysotile asbestos fibers such as commercial Grade 3R12 (Quebec Standard Screen Test) is cleaned and formed into a mat without the use of any binder material. This allows for a substantially 100 percent asbestos mat prior to the impregnation. This particular feature is quite important to the invention and its significance will be illustrated hereinafter. The initial feed used to produce the mat may contain any one or a combination of the opacifiers earlier listed. These opacifiers are particularly chosen according to or for their "fire retardant" characteristics. "Fire retardant" as used in this specification is intended to include those materials or fillers which although not originally fire retardant become so because of a chemical change when subjected to later applied heat. The opacifiers may be of metallic type combining radiation reflection and absorption—e.g. metallic aluminum or silicon powder; or, radiation absorbing type—e.g. carbon black or finely divided pigments such as ilmenite, manganese oxide, or chromium oxide; or radiation scattering type—e.g. zircon, titanium dioxide, or other materials with a high index of infra-red refraction.

It is again emphasized that the felt up to this time has not been treated with any resinous product nor any binder. The felt is thus capable of complete disassociation prior to impregnation. The thus formed felt is placed upon a foraminous support such as a screen and immersed in a resin solution preferably containing at least 20 percent solvent carrier. Such a resin can be illustrated by a phenol formaldehyde product such as Monsanto resin SC–1008. The solvent carrier is preferably ethyl alcohol. This immersion step is rather critical and will be explained in further detail below. After impregnating the felt, it is removed from the solution and is allowed to drain and air dry. This particular drying is another important step of the process. It is highly desirable that it be conducted under particular controlled conditions; i.e., at a slow enough rate and preferably under temperatures not exceeding 120° F. so as to preclude premature curing to the C-stage. The absence of solvent in the conventional product is thought to be one of the major contributing factors to poor shelf life.

Figure 3:
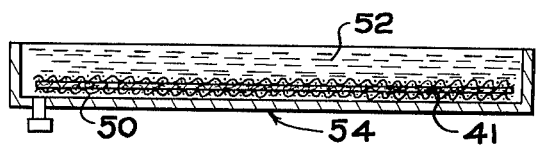
FIG. 3 is a cross-sectional view of a tank in which the felt, produced by the apparatus, may be immersed and impregnated.

With reference to FIG. 2, a preferred embodiment of the invention can be illustrated. A supply of chrysotile asbestos 9 in a hopper 10 of feeder 12 is transferred onto a pin lifting apron 14 by travelling apron 16. Adjacent the upper portion of return flight 15, of the lifting apron 14, is positioned doffer 18 to discharge the fiber onto conveyor 20 which leads to a picking and forming machine 22. The machine 22 is preferably a modified common commercial cotton picker type. A pair of rolls 24 and 26 feed the fiber to pin beater 28. The beater 28 is driven by suitable means (not shown) in a manner so that the fiber is drawn downward by the pins and thrown upward into an air stream in chamber 30. The air stream directs the fiber onto perforated condenser rolls 32 and 34. Except for the inlet 36 at rolls 24 and 26 and the perforations 38 in condenser rolls 32 and 34, the chamber 30 is substantially air tight so that a preferred air stream may be defined. Air is suitably exhausted into the perforations 38 by fan 40 and controlled to produce a felt or mat having a density of 25 to 50 pounds per cubic foot. In the preferred process, the felted fiber 41 is advanced from driving rolls 42, 43 and 44 of the picker onto a platen of a second picker which is constructed and operates in the same manner as the first machine 22. This is consequently not shown. Before introduction into the second picker, the felt 41 may be appropriately dusted or coated with a fire-retardant filler or opacifier material previously described. Before immersion, a plurality of these loose felts are combined in layer form with one layer being dusted with a "fire retardant" filler or opacifier in the form of a titanium compound. Preferably, approximately 1 part by weight of filler to 16 parts by weight of fiber is employed. The dusted layers of felt are collected and placed on screen 50 for immersion into the impregnating solution 52 in tank 54 (see FIG. 3).

The impregnating solution may be represented by a 40 percent by weight of a thermosetting resin such as the phenol formaldehyde condensation product sold under the trade name SC–1008 by Monsanto Chemical Company. The material contains approximately 62 percent solids. The remainder of the impregnating solution, 60 percent, preferably comprises ethyl alcohol. It is most desirable that the employed resin solution contain a solvent which will float the fibers and disperse them in such a manner whereby the solvent acts as a carrier not only to penetrate but also to envelop the individual fiber bundles with the resin solution. This phenomenon is in the nature of a mechanical separation as opposed to a chemical dispersion. The felt is maintained in an immersed condition about 8 minutes at room temperature. During this period of time the previously unbound fibers can disassociate and float to the top of the solution. By so allowing the fibers to form, a completely integrated matrix can result. The fibers do not become orientated to any recognizable degree. This is opposed to previous methods wherein the fibers were previously aligned and orientated by means of a binder pretreatment, and then subjected to a resin impregnation. Such a mat was obviously subject to mechanical weakness. The instant floating process not only serves to float the fibers into an integrated structure but in the case of asbestos fibers additionally serves to open the individual fibers and allow for better saturation. Again a complete opening would not be possible with a binder-restricted mat. Consequently, it is deemed highly desirable that the impregnation step be carried out under substantially quiescent conditions so the fibers will not become orientated by liquid movement. This will allow for substantially complete intertwining of the fibers without the formation of "layers" within the felt. The more integral the fiber structure, the stronger and more homogeneous the product.

Figure 4:
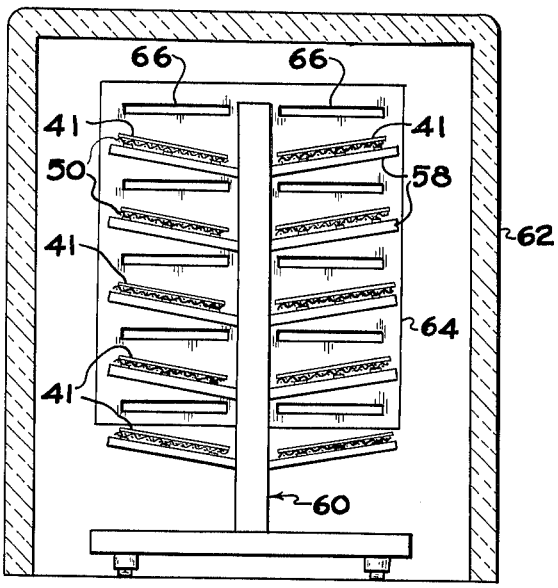
FIG. 4 is an end elevational view of a drying rack upon which the impregnated felts may be placed.

The impregnated mat is then removed from the solution and allowed to drain for 1 to 2 minutes. This felt is then placed upon a foraminous shelf 58 of rack 60 (see FIG. 4) for a drying period. The length of the drying period may be as long as 14 days. The length of time is dependent on the temperature and other conditions with satisfactory results being obtainable in 4–5 days. The product is not to be completely dried. During this drying period, the felt may be intermittently inverted, approximately every 24 hours, to deter settling of the entrapped solvent to one face of the felt. The product in its final condition preferably contains about 10 percent entrapped solvent. Thus the final product contains about 47 percent fiber, approximately 40 percent thermosetting resin, approximately 3 percent filler and approximately 10 percent entrapped solvent. The final product preferably is of a thickness, defined in terms of weight per square foot, of approximately .3 to 1.0 pounds per square foot material. A 1.0 pound per square foot material has a normal thickness of ⅛ inch and cures to .083 inch when 100 pounds per square inch pressure under standard temperatures is applied. The final product has a leather-like appearance.

While the drying has been conducted at room temperature in the preferred embodiment, it is apparent that the drying step may also be carried out with forced air but should not be carried out with temperatures exceeding 120° F. Products, characterized by some of the properties and thus capable of some adaptations, may be produced at other higher temperatures. Such a practice may be carried out in an enclosure such as that illustrated in FIG. 4, generally designated by the numeral 62. The enclosure 62 may be provided with an air supply duct 64 having outlets 66 positioned between the shelves 58 to direct air longitudinally of the felts 41.

Furthermore, it should be understood that the immersion step could be part of a continuous process which maintains substantially quiescent conditions. Thus the felt of limited dimensions could be placed in any one of several immersion baths arranged in alternative fashion to allow for a continuous feed of felts and sufficient soaking and removal of a prior felt before the feeding of subsequent felts.

After the desired number of days of drying, the impregnated felt desirably contains approximately 10 percent solvent. As explained above, this solvent beneficially effects the process characteristics of the felt during the later molding operations. Such a felt is completely adapted for use as a preform material in any one of several adaptations without the necessity of applying further additives and without further treatment other than that necessary to finally cure the molding composition. The solvent is tenaciously retained in the impregnated felt for weeks e.g., for as long as 14 to 16 weeks or longer. The length of the shelf life is, of course, dependent upon conditions of temperature and amount of exposure to the atmosphere before its ultimate use.

Figure 5:
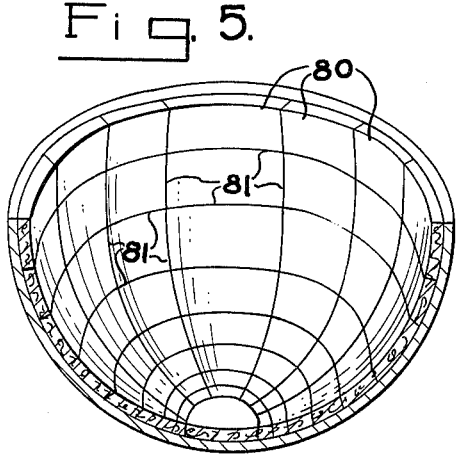
FIG. 5 is a cross-sectional view showing a mold "mocked-up" with material of the prior art.
Figure 6:
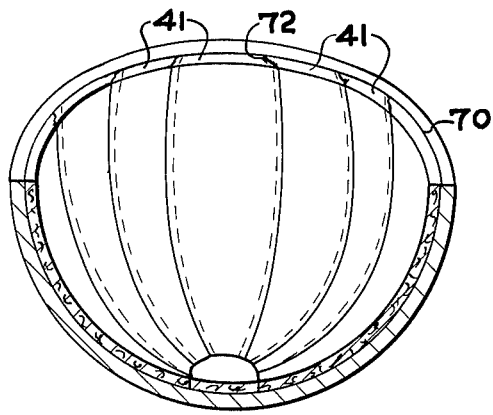
FIG. 6 is a typical cross-sectional view showing a mold "mocked-up" with the material of the instant invention.

In such an ultimate use, strips 41 of the felt may be laid in a mold cavity 70 as shown in FIG. 6. The felts are sufficiently pliable that they may be hand worked to form overlapping joints 72. This feature and the plasticity of the preformed sheet result in remarkable time saving over the prior procedure of fitting segments in abutment as represented in FIG. 5.

In the prior method of fitting represented in FIG. 5, each of the individual segments 80 must be accurately cut to the desired configuration and carefully fitted into place. The flow characteristics of the prior materials do not permit the segments to properly bridge or integrate themselves, hence, the final product displays the same lines of demarcation 81 as in the "mock-up" state whereas the moldable material of the invention shown in FIG.

Figure 7:
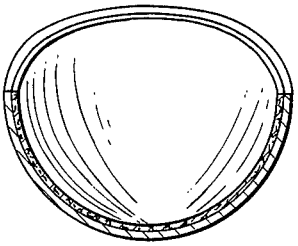
FIG. 7 is a view of the mold of FIG. 6 after curing, illustrating the absence of any demarcation lines or channels.

6 results in a final product characterized by the absence of lines of demarcation as exemplified in FIG. 7. The inability of the prior material to flow results in channeling at the demarcation lines, which channeling accelerates the destruction of the product.

As stated above, this prior manner of mocking-up normally consumed about two thousand man-hours. The mock-up time when using the materials of this invention is reduced to approximately thirty hours. After the mold is mocked-up, it is subject to a final curing step by heating and/or pressure during which time the resin and fibers at the overlapping joints 72 migrate to form a substantially homogeneous product illustrated in FIG. 7. Again, the unusual long shelf life exhibited by the impregnated felts of this invention facilitates the good flow characteristics. Such a homogeneous product is particularly useful in applications subjected to ablation since in its homogeneous form, it is less susceptible to breaking away in "chunks" or delaminations as compared to the prior non-homogeneous product.

There are a wide variety of different thermosetting resins which may be employed to produce the new molding materials of this invention. Furthermore, it is possible that in view of the synthetic resin technique conditions, additional thermosetting resins will become available which may be adapted in the novel processing of this resin. The set-up of the thermosetting resin is dependent on the ultimate resin characteristics. Those thermosetting resins which have been found particularly adapted for use in this invention are those referred to in the trade as phenol resin, unsaturated polyester resin and epoxy resin. The preferred resins are of the phenol-formaldehyde type.

The phenol resins are generally condensation products of a phenol and an aldehyde such as phenol and formaldehyde. Any of the phenol resins which are capable of being cured to a thermosetting resin may be applicable. This includes not only a one-stage resin but also any two-stage resins where a condensation product such as novolac is catalytically cured to a final state. Examples of operable phenolic resins are phenol-furfural, m-cresol formaldehyde, xylenol formaldehyde, resorcinol-formaldehyde, etc. Other resins such as urea formaldehyde, aminotriazine-aldehyde resins e.g., melamine-formaldehyde are also useable. The temperature and other curing conditions are contingent upon the particular resin selected.

The unsaturated polyester resins are the esterfication products of unsaturated alcohol with polybasic acids or unsaturated acids with mono- or polyhydric alcohols. These polyesters may be made from glycols such as ethylene glycol, propylene glycol, 2,3-butanediol and unsaturated dibasic acids such as citraconic, maleic, fumaric, itaconic, etc. A portion of the unsaturated acid may be replaced by a saturated dibasic acid such as adipic acid, phthalic acid, etc. Small portions of vinyl composition may be included in the polyester composition such as monomers of styrene, vinyl acetate, methyl methacrylate, etc. A typical modified polyester is a styrene modified condensation product of an ethylene glycol with mixtures of anhydrides such as those of adipic and fumaric acids.

The epoxy resins suitable for use in the instant invention are those containing along with ethereal oxygen, glycidyl groups in such quantities that the material has an 1,2-epoxy equivalence greater than one. This means that the average number of 1,2-epoxy groups per molecule is greater than one. Suitable epoxies include such products as the reaction of a dihydric phenol with epichlorhydrin; e.g., bisphenol A epichlorhydrin. Other epoxies may be 1,2-epoxy containing ethers of polyhydric alcohols such as diglycidyl ether of ethylene glycol.

The particular impregnating solution may be varied to include several organic solvents such as ethanol, methyl-ethyl-ketone, benzene, gasoline and the like. The choice is dependent upon several factors such as toxicity, ability to float fibers, flammability and cost. Ethanol has shown particularly good results.

The opacifier selected may be any one of the well known materials such as potassium titanate fibers tungsten fibers, carbon fibers, refractory fibers, e.g., aluminum silicate, etc. The amount may be varied to include up to 30 percent depending upon the desired results. Of course it is not necessary to use great amounts, e.g., greater than the fiber or resin content.

The particular fiber shown as highly preferable is asbestos fiber. However, any fibrous material capable of resisting high heat and temperature applications such as glass wool, and mineral wool may be profitably combined with the asbestos. Some applications may consider employing the fiber without its use with asbestos.

The following tests were performed on various products made according to the instant invention. In each case a mat was molded at 100 p.s.i. and blocks 6 inches by 6 inches by ½ inch were cut. Each block was fastened in a metal holder at an angle of 30° from the vertical. An oxyacetylene torch with a flame measured at 4000° F. was placed one inch from the center of the block, the inclination being directed toward the torch. Each block was tested for an erosion/rate which was measured in mils per sec. by recording the time necessary for the flame to erode through the mat. Additionally, the temperature on the cold face was measured by fastening a thermocouple to this side. The temperature rise was recorded every 30 seconds for a period of 2 minutes. The samples thus tested were made up using, by weight of the final product, 45 percent phenol formaldehyde resin, 49 percent asbestos fibers and 6 percent of an opacifier. The opacifiers used were potassium titanate fibers, tungsten fibers, a refractory (aluminum silicate) fiber, and carbon fiber in that order. The results of tests are shown below in Table I wherein Samples A, B, C and D correspond, respectively, to the list of opacifiers above. In each case the data given is the average of 3 tests.

| Sample | Erosion rate, mils/sec. | Temperature rise on cold face from 75° F. | | | |
|---|---|---|---|---|---|
| | | 30 sec. | 60 sec. | 90 sec. | 120 sec. |
| A | 1.00 | 27 | 74 | 96 | 147 |
| B | 0.91 | 21 | 38 | 86 | 151 |
| C | 1.19 | 12 | 32 | 84 | 157 |
| D | 1.01 | 13 | 25 | 69 | 131 |

From the foregoing specification it is apparent that this disclosure is one of a new molding compound and new processes for both making and using the composition. This new molding material is distinguished by the fact that it is capable of a shelf life far superior to that known before. The extended shelf life enables the product to be hand workable at the site of the insulation. This feature is considered to be important. First, it results in a homogeneous product; and second, the amount of time saved is more than substantial. The superiority of the instant material in an ablation process is illustrated and the other superior characteristics evidenced. The particular moldable material because of its high temperature characteristics is uniquely adapted for use in internal insulation of rockets and missiles. However, it is apparent to one skilled in the art that such a compound undoubtedly is susceptible to many adaptations. For instance, when a rocket is fired through the atmosphere, surface friction generates a tremendous amount of heat. Consequently, the high temperature resistant molding composition of this invention could find application as a covering for the outside of the rocket to assist its passing through the atmosphere. However, still broader applications are possible wherever shelf life has been a problem. Adaptations of the instant invention may be used to extend the now realized shelf lift.

Having provided a complete description of the invention in such a manner as to distinguish it from other inventions and from what is old and having provided a description of the preferred conditions needed in order to carry out the invention, the scope of the patent to be granted is to be determined by the following claims:

What we claim:

1. A method of producing a fiber reinforced moldable product of a thermosetting resin matrix comprising the following steps: (1) forming a loose non-woven dry fibrous mat, (2) immersing said dry mat in a solution containing a thermosetting resin and an organic liquid carrier for a period of time to dissociate the fibers of the mat, open said fibers and float said fibers to form a new and integrated mat wherein said fibers are randomly oriented, (3) removing said new mat from said solution, and (4) partially drying and partially curing the resin to partially remove the carrier to thereby produce a pliable hand moldable product containing entrapped carrier, said carrier being entrapped by the partially cured resin.

2. A method as defined in claim 1, wherein the fibers, prior to immersion in said solution, are collected to form a mat of 100 percent fibers and having a density of 25 to 50 pounds per cubic foot.

3. A method as defined in claim 1, wherein the organic carrier is selected from the group consisting of alcohol, ketones and mixtures thereof.

4. A method of producing a non-woven fiber reinforced resinous matrix which comprises: immersing a layer of dry fibrous material, wherein the fibers are in a free, random and uncompressed arrangement, into a solution of resinous material and resin carrier to simultaneously disperse, float, and saturate the fiber in and with said resinous material.

5. A method of producing a fiber reinforced material which comprises the steps of: (1) forming a loose uncompressed random arrangement of a fibrous dry felt, (2) immersing the fibrous dry felt in a solution of synthetic resin and organic solvent wherein the fibers of said felt are dispersed, impregnated, floated, and formed into a new felt, and (3) drying the thus impregnated material to permit a partially cured film to form on the exterior surface of the fibers prior to the complete removal of the carrier to thereby entrap sufficient carrier to form a pliable resinous mat.

6. A method as described in claim 5, which comprises the further step of introducing an opacifier in the form of a powder filler to the felt prior to impregnation.

7. A method of making a fiber reinforced resinous sheet comprising the steps of: (1) divellicating a supply of fiber agglomerates, (2) distending the resultant fiber by passing said fiber in an air-borne stream, (3) collecting the fiber from the air-borne stream in a layer, wherein the fibers are in a loose uncompressed random arrangement to provide a flocculent dry mat, (4) immersing and suspending said dry mat in a solution containing about 20 to about 80 percent resin and at least about 20 percent solvent wherein the fibers of said mat are dispersed, impregnated, floated, and formed into a new mat, and (5) removing the impregnated mat from said solution and drying it at such a rate as to form a partially cured resinous film on the exterior surface of the fiber and simultaneously to entrap sufficient solvent to form a pliable resinous sheet containing at least 6 percent by weight solvent.

8. A method as described in claim 7 wherein the said mat is dried after immersion in said solution for a period of 4 to 5 days on a foraminous support, during which time it is intermittently inverted.

9. A method as described in claim 7 further comprising the step of dusting said mat prior to impregnation with an opacifier comprising a titanium compound.

10. A method as described in claim 9 wherein about 1 part by weight of opacifier is distributed for 16 parts by weight of fiber.

11. A method of making a fiber reinforced resinous sheet comprising: (1) divellicating a supply of chrysotile asbestos fiber agglomerates, (2) distending the fiber in an air stream, (3) forming a mat of the distended fiber in a random and loose uncompressed arrangement, (4) immersing said mat in a synthetic thermosetting solution for sufficient time as to allow complete dissociation of the fiber in the original mat, flotation of the fibers, and ultimate forming of a new totally integrated mat wherein the fiber is in a random and loose uncompressed arrangement, said resin being in a solution of a solvent selected from the group consisting of alcohol, ketone and mixtures thereof, and (5) heating such impregnated mat at a rate and temperature which forms a partially cured film on the exterior surface of the fiber and simultaneously entraps sufficient solvent to thereby form a pliable resinous sheet of extended shelf life.

12. A method as defined in claim 11 wherein the resin impregnating step is performed in substantially quiescent conditions.

13. A method of producing a homogeneous thermal barrier exhibiting high ablation characteristics comprising: (1) forming a loose non-woven fibrous mat, (2) immersing said mat in a solution containing a thermosetting resin and an organic liquid carrier for a period of time to dissociate the fibers of the mat, open said fibers, float said fibers, and form a new completely integrated mat wherein said fibers are randomly arranged, (3) removing said new mat from said solution, (4) partially curing the resin and partially removing the carrier to thereby produce a pliable hand moldable product containing entrapped carrier, said carrier being entrapped by the partially cured resin, (5) shaping said mat to conform to the shape of the article to be protected and curing the shaped mat to a state of final cure to produce the said barrier.

14. The method of producing a plastic cohesive moldable felt insulation which comprises: immersing a binder free mat of inorganic fiber, in random and uncompressed arrangement, in a dispersion of thermosetting resin in a solvent selected from the group consisting of alcohols and ketones and mixtures thereof, within which dispersion the fibers of said mat are dispersed, impregnated, floated to form an impregnated felt, said dispersion comprising approximately 15–60% by weight total of said resin and approximately 85–40% by weight total of said solvent; and drying the thus impregnated felt at a temperature not in excess of approximately 120° F. and entrapping therein solvent comprising 6–12% by weight total of said felt.

15. A pliable resinous product comprising:
   a non-woven felt of individual fiber bundles impregnated with thermosetting resin solution, the thermosetting resin being in solution with a solvent carrier; and
   said individual fiber bundles being completely enveloped by said solution; and
   a film on the exterior surfaces of said felt,
   said film being formed by the partial curing of said solution at said exterior surfaces,
   a substantial portion of said solvent carrier being entrapped within said exterior surfaces by said film whereby hand moldable characteristics are imparted to said product, and
   there being, by weight of the product:
      30 to 65 percent fiber
      15 to 65 percent resin and
      at least 6 percent entrapped solvent carrier.

(References on following page)

References Cited by the Examiner

UNITED STATES PATENTS

| | | | |
|---|---|---|---|
| 2,249,888 | 7/1941 | Dodge | 154—101 |
| 2,288,072 | 6/1942 | Collins | 154—28 |
| 2,373,033 | 4/1945 | Kopplin | 154—101.01 |
| 2,445,415 | 7/1948 | Anderson | 154—44.1 |
| 2,567,559 | 9/1951 | Greider et al. | 154—44.1 |
| 2,647,851 | 8/1953 | Schwartz | 156—32 |
| 2,699,415 | 1/1955 | Nachtman | 156—173 |
| 2,702,069 | 2/1955 | Lanman | 154—28 |
| 2,787,572 | 4/1957 | Schwartz | 156—36 |
| 2,835,107 | 5/1958 | Ward | 60—35.6 |
| 2,849,346 | 8/1958 | Almen et al. | 154—101 |

EARL M. BERGERT, *Primary Examiner.*

CARL F. KRAFFT, *Examiner.*